United States Patent
Lanoue et al.

(10) Patent No.: US 12,460,551 B1
(45) Date of Patent: Nov. 4, 2025

(54) ADDITIVELY MANUFACTURED TURBINE ENGINE CASE

(71) Applicant: RTX Corporation, Farmington, CT (US)

(72) Inventors: Timothy James Lanoue, West Hartford, CT (US); Weston Matthew Behling, Coventry, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/819,486

(22) Filed: Aug. 29, 2024

(51) Int. Cl.
*F01D 9/04* (2006.01)
*F01D 25/24* (2006.01)
*B33Y 80/00* (2015.01)

(52) U.S. Cl.
CPC .......... *F01D 9/042* (2013.01); *F01D 25/243* (2013.01); *B33Y 80/00* (2014.12); *F05D 2240/14* (2013.01)

(58) Field of Classification Search
CPC .............................. F01D 9/042; F01D 25/243
See application file for complete search history.

(56) References Cited

U.S. PATENT DOCUMENTS

| | | | |
|---|---|---|---|
| 5,899,660 A * | 5/1999 | Dodd | F01D 25/243 |
| | | | 415/214.1 |
| 8,656,989 B1 | 2/2014 | Williams et al. | |
| 9,429,039 B2 * | 8/2016 | Finlayson | F01D 25/24 |
| 10,794,200 B2 * | 10/2020 | Simonds | F01D 25/24 |
| 11,499,448 B2 | 11/2022 | Yadav et al. | |
| 11,519,291 B2 | 12/2022 | Kling | |
| 11,781,437 B2 * | 10/2023 | Karafillis | F01D 25/24 |
| | | | 415/144 |
| 2018/0117873 A1 | 5/2018 | duPont | |

FOREIGN PATENT DOCUMENTS

CN 209604175 U 11/2019

OTHER PUBLICATIONS

Matweb, Material Properties, Titanium Ti6Al4V (Year: 2020).*
Special Metals, Material Properties, Inconel 718 (Year: 2021).*

* cited by examiner

*Primary Examiner* — Courtney D Heinle
*Assistant Examiner* — John S Hunter, Jr.
(74) *Attorney, Agent, or Firm* — Bachman & LaPointe, P.C.

(57) ABSTRACT

An isogrid structure has a wall having a first face and a second face. An isogrid of hollow ribs is formed on the wall second face. The ribs of the isogrid have respective rib interiors. The wall comprises a first alloy and the ribs comprise a second alloy different from the first alloy. Junctions of the ribs are at bosses having an interior surface open to the rib interiors and an external environment.

20 Claims, 6 Drawing Sheets

ADDITIVELY MANUFACTURED TURBINE ENGINE CASE

BACKGROUND

The disclosure relates to gas turbine engines. More particularly, the disclosure relates to isogrid engine cases.

Gas turbine engines (used in propulsion and power applications and broadly inclusive of turbojets, turboprops, turbofans, turboshafts, industrial gas turbines, and the like) have isogrid engine cases in one or more sections of the engine. A typical isogrid case includes a circumferentially and longitudinally extending wall structure with integral ribs on its outer diameter surface. The ribs form an isogrid or a crisscross pattern. Opposite axial ends may have mounting flanges for mounting to adjacent hardware such as a case section forward or aft thereof.

One particular example of an isogrid case is for the fan section of a low bypass turbofan engine. An example such case is a 180° segmented case wherein each of two segments is a unitarily-formed machining. The two segments are bolted at circumferential end flanges. The inner diameter surface of the case wall may have mounting features for stages of vanes that alternate with blade stages of the fan section. Example mounting features are circumferentially-extending slots.

SUMMARY

One aspect of the disclosure involves an isogrid structure comprising: a wall having a first face and a second face; and an isogrid of ribs on the wall second face and having respective rib interiors. The wall comprises a first alloy and the ribs comprise a second alloy different from the first alloy.

In a further embodiment of any of the foregoing embodiments, additionally and/or alternatively: the structure is a 180° segment; the wall has a first circumferential end flange and a second axial end flange; and the wall has a first axial end flange and a second axial end flange.

In a further embodiment of any of the foregoing embodiments, additionally and/or alternatively, the first alloy is a titanium alloy and the second alloy is an iron-nickel-cobalt alloy.

In a further embodiment of any of the foregoing embodiments, additionally and/or alternatively, the first alloy is a titanium alloy and the second alloy is an aluminum alloy.

In a further embodiment of any of the foregoing embodiments, additionally and/or alternatively, the isogrid case structure has: a first longitudinal end at a first end flange; a second longitudinal end at a second end flange; a first circumferential end at a first longitudinal flange; and a second circumferential end at a second longitudinal flange. The body section first face is concave between the first longitudinal flange and the second longitudinal flange.

A further aspect of the disclosure involves gas turbine engine including the isogrid structure and further comprising a plurality of vanes mounted to the wall.

A further embodiment of any of the foregoing embodiments may additionally and/or alternatively include a second isogrid structure mounted to the isogrid structure to form a full annulus.

In a further embodiment of any of the foregoing embodiments, additionally and/or alternatively, an external component is mounted to the case structure via one or more features on the wall.

A further aspect of the disclosure involves a method for manufacturing the isogrid structure, the method comprising: machining of the wall from billet; and additively manufacturing the ribs to the wall.

In a further embodiment of any of the foregoing embodiments, additionally and/or alternatively, the additive manufacture is material jetting.

A further aspect of the disclosure involves method for using the isogrid structure, the method comprising: mounting vanes to the wall; and mounting the structure as case segment of a turbine engine.

A further embodiment of any of the foregoing embodiments may additionally and/or alternatively include running the engine wherein the ribs restrain thermal expansion of the wall.

A further aspect of the disclosure involves an isogrid structure comprising: a wall having a first face and a second face; and an isogrid of ribs on the wall second face and having respective rib interiors, Junctions of the ribs are at bosses having an interior surface open to the rib interiors and an external environment.

In a further embodiment of any of the foregoing embodiments, additionally and/or alternatively, the wall comprises a first alloy and the ribs comprise a second alloy different from the first alloy. Optionally, the second ally has a coefficient of thermal expansion at least 10% less than a coefficient of thermal expansion of the first alloy, optionally 20% to 50% less.

In a further embodiment of any of the foregoing embodiments, additionally and/or alternatively, the bosses are annular.

A further aspect of the disclosure involves a method for manufacturing an isogrid case structure, the method comprising: machining a body section having a first face and a second face; and additively manufacturing an isogrid of ribs to the second face.

In a further embodiment of any of the foregoing embodiments, additionally and/or alternatively, the isogrid case structure has: a first longitudinal end at a first end flange; a second longitudinal end at a second end flange; a first circumferential end at a first longitudinal flange; and a second circumferential end at a second longitudinal flange. The body section first face is concave between the first longitudinal flange and the second longitudinal flange.

In a further embodiment of any of the foregoing embodiments, additionally and/or alternatively, the body section is of a first metal or alloy and the ribs are of a second metal or alloy having a different largest by weight element than does the first metal or alloy.

In a further embodiment of any of the foregoing embodiments, additionally and/or alternatively, the ribs are hollow.

In a further embodiment of any of the foregoing embodiments, additionally and/or alternatively, the ribs have interiors open at at least one node of the isogrid.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
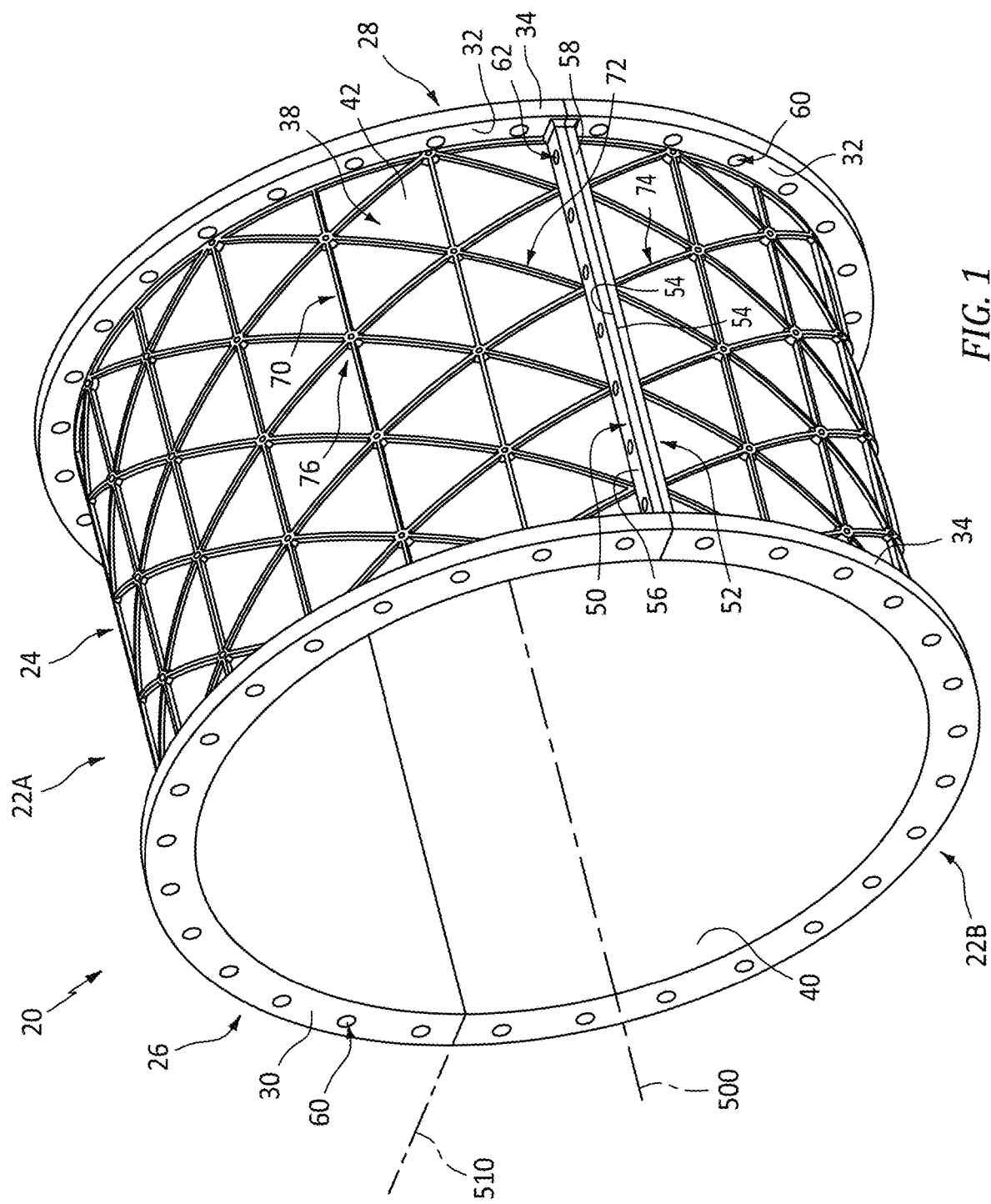
FIG. 1 is a view of a gas turbine engine isogrid case assembly
Figure 2:
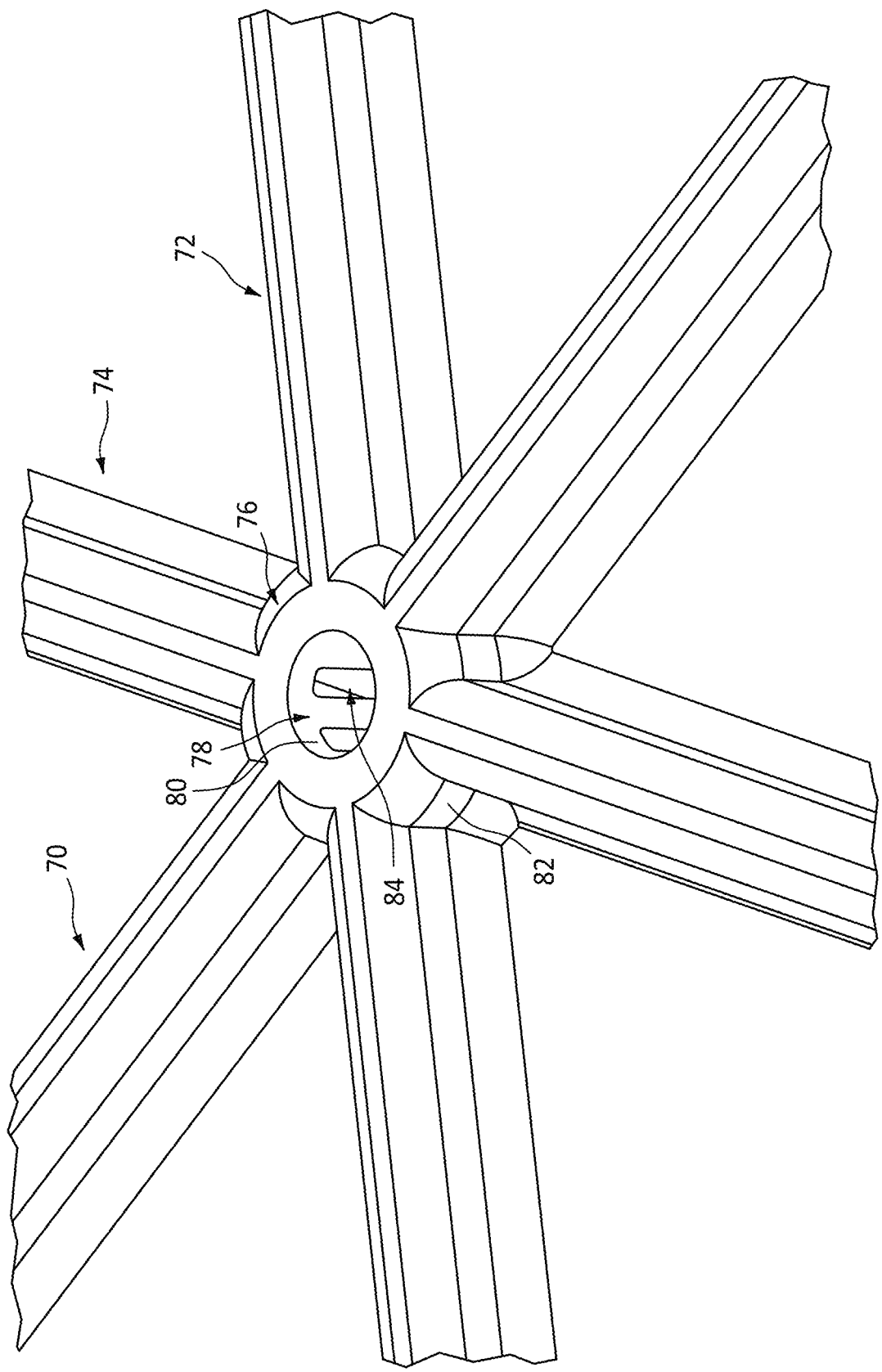
FIG. 2 is a view of an isogrid junction/node in the case assembly of FIG. 1.

FIG. 1 shows a an isogrid case 20. As is discussed further below, the case may be based on baseline case and may serve as a drop-in replacement. In one departure from the baseline, the segment machining does not produce the ribs but the ribs are additively manufactured. There may be ancillary aspects including use of dissimilar materials for the machining and the ribs. In another potentially overlapping departure, the ribs may be hollow.

The case has a central longitudinal axis 500. The example case 20 is a split case with two halves/segments 22A, 22B meeting at a mounting plane 510. The case includes a main body section 24 and a pair of end flanges 26, 28. The two halves each have respective sections of these features. Each end flange includes an outboard section or face 30, an inboard surface or face 32 facing the main body section, and an outer diameter rim or periphery section 34. The case has an inner diameter surface 40 and an outer diameter surface 42.

Each case half has first and second longitudinally-extending circumferential end flanges 50 and 52. As with the longitudinal end flanges, the circumferential end flanges each include a circumferentially outboard surface or face 54, a circumferentially inboard surface or face 56, and a rim surface 58. The longitudinal end flanges 26, 28 each have a circumferential array of mounting holes 64 for mounting to adjacent case structure such as via bolts (not shown). Similarly, the circumferential end flanges 50, 52 each have a longitudinal array of mounting holes 62 for mounting the first circumferential end flange of one segment to the adjacent second circumferential end flange of the other segment such as via bolts (not shown).

As noted above, the example main body section has a wall section 38 formed of one material and ribs formed of another material. As in the baseline discussed, the machining may be of a single-piece unitary structure such as machined from a billet of the relevant alloy and to which the ribs are subsequently added. FIG. 1 shows the isogrid as including three sets of ribs. A first set/groups of ribs 70 is a circumferential array of longitudinally-extending ribs. Second and third sets/groups of ribs 72 and 74 are longitudinally spaced spiral ribs extending in opposite directions (opposite sense of spiral). The ribs meet at junctions 76 at nodes of the isogrid pattern. Example junctions are formed as circular bosses having central apertures 78. The example bosses have interior surfaces 80 and exterior surfaces 82. The example ribs are hollow having passageways 84 open to the boss interior surfaces. The boss interior openings allow venting of the rib interiors. Within the main body of the example grid, six rib segments meet in three pairs with each segment of a given pair being aligned with the other as if a single rib interrupted by the node/junction. At ends of the grid, there may be fewer intersecting ribs.

Figure 3:
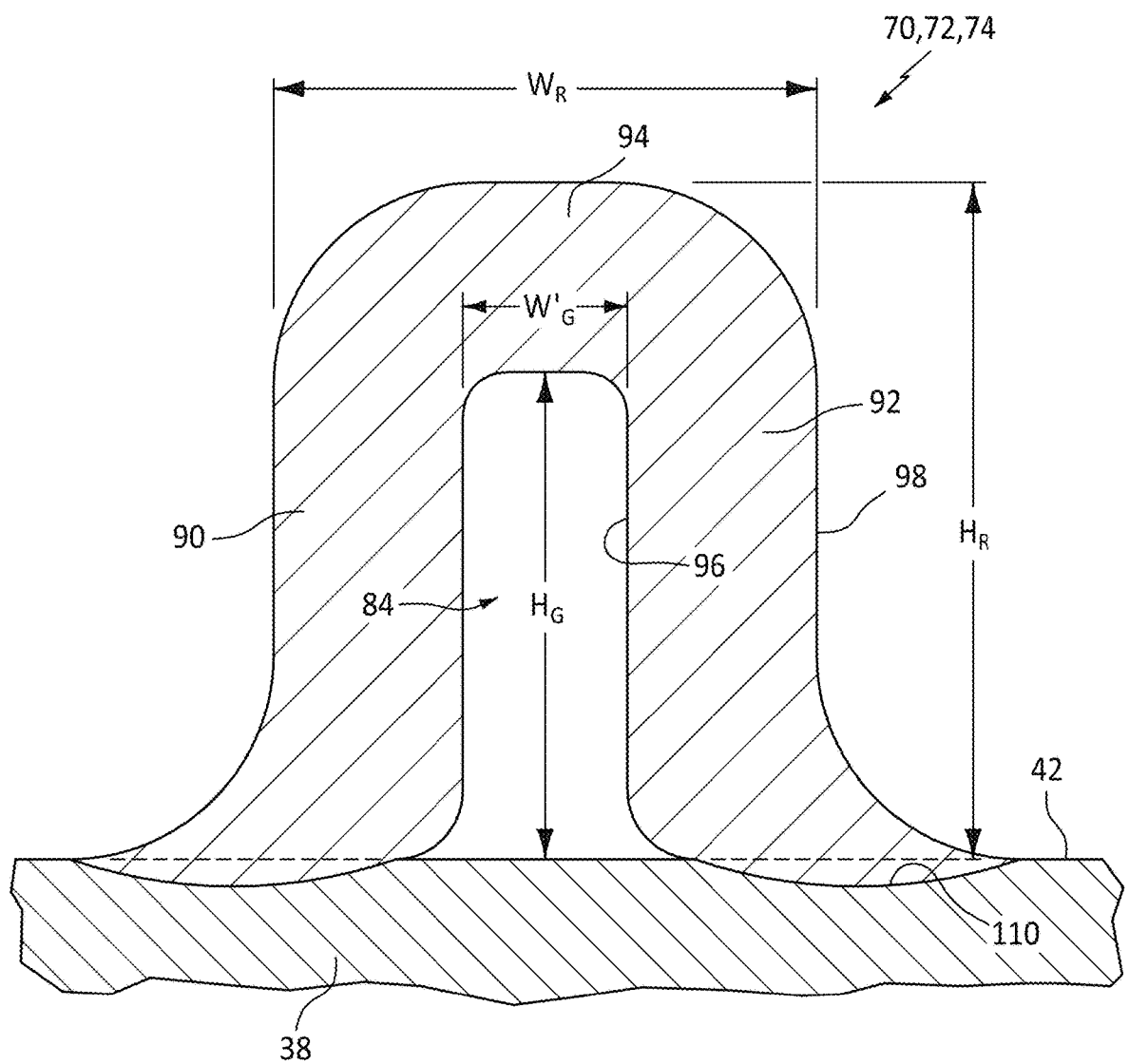
FIG. 3 is a sectional view of a rib of the isogrid.

FIG. 3 shows an example rib structure having a U-shaped channel cross section with a pair of sidewalls 90, 92 and a base 94. The rib has an interior surface 96 and an exterior surface 98. In the illustrated example, the machining of the wall 38 forms troughs 110. The trough pattern corresponds to the additive manufacture footprint of the ribs and bosses. The trough increases surface area at the junction between materials and reduces planarity of such junction. These can improve retention/bonding when the materials are subject to differential thermal expansion. An example additive manufacture process is material jetting (MJ). Alternatives include powder bed fusion (PBF), binder jetting, and metal extrusion.

FIG. 3 shows a rib height HR above surrounding machined material 38. It also shows a median rib width WR. It also shows a channel or gap height $H_G$ above surrounding machined material 38. It also shows a median channel/gap width $W_G$. Example rib height is about 0.25 inch (6.4 millimeters), more broadly 4.0 millimeters to 20 millimeters or 4.0 millimeters to 10 millimeters, or 5.0 millimeters to 8.0 millimeters. Example median rib width is about 0.2 inches (5.0 millimeters), more broadly 3.0 millimeters to 15 millimeters or 3.0 millimeters to 10 millimeters. Example rib height to median width ratio is between 1:1.2 and 1.5:1. Example gap height is 50% to 75% of rib height. Example median gap width is 5 to 50% of median rib width.

Having the channel-like cross-section increases strength of the ribs relative to their weight. The bosses allow venting of the ribs while maintaining the strength and reducing stress concentrations relative to simply putting apertures in the rib bases 94.

Figure 4:
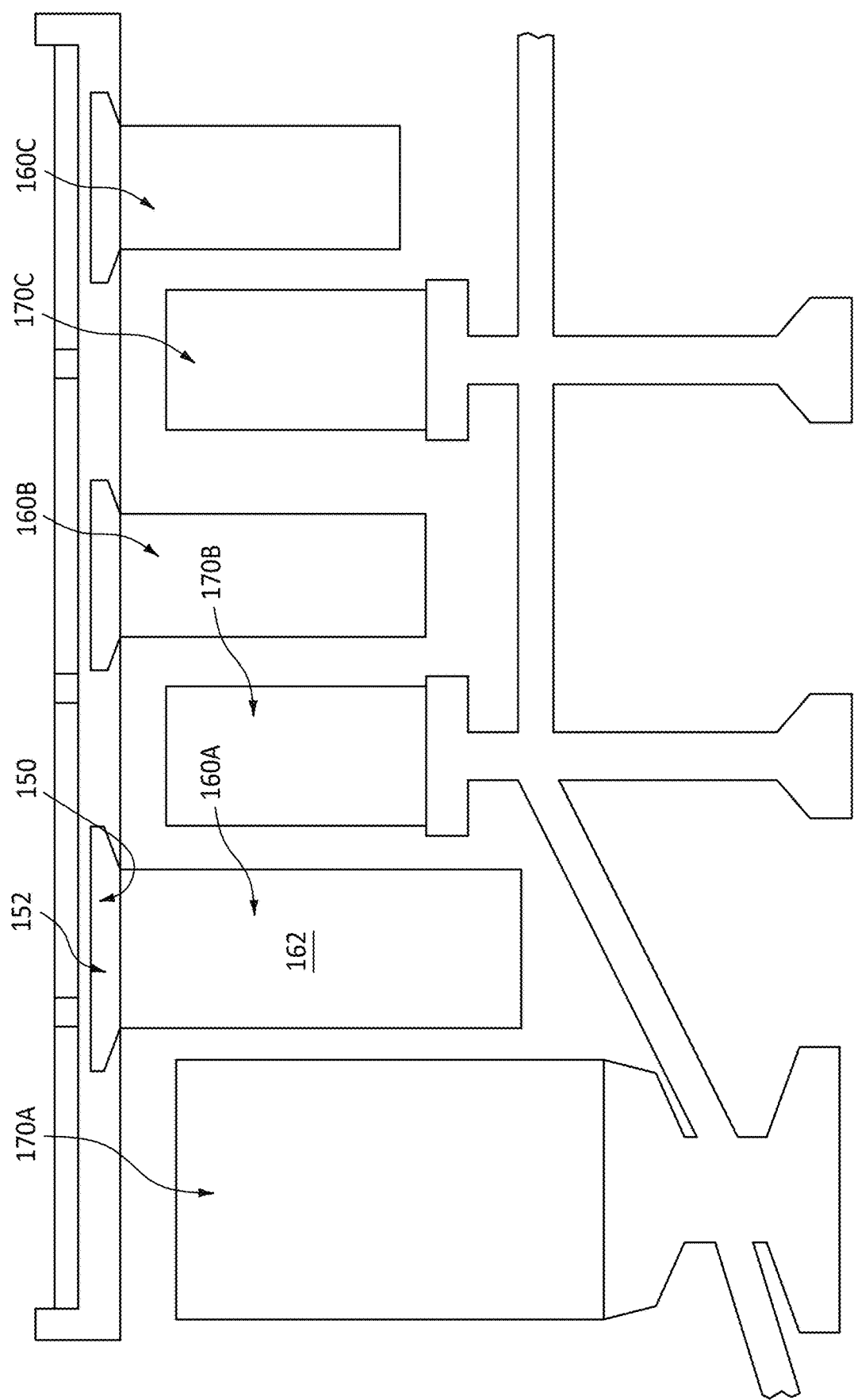
FIG. 4 is a schematic longitudinal sectional half view of a fan section of a turbofan engine.

As noted above, FIG. 4 shows the case with ID dovetail slots 150 receiving OD mounting lugs 152 of vane stages 160A-160C having airfoils 162. FIG. 4 also shows the fan blade stages 170A-170C alternating with the vane stages.

In one example, the segment machinings from billet stock are of titanium or a titanium-based alloy (e.g., Ti as largest by-weight constituent, optionally at least 50% (e.g., a TiAl alloy such as Ti-6Al-4V)) with additive aluminum or aluminum alloy (e.g., Al as largest by-weight constituent, optionally at least 50% (e.g., an AlSi alloy such as Al-Si12-Mg)) ribs for weight savings relative to Ti-6Al-4V alone.

An alternative material combination is that the segment machinings from billet stock are of titanium or a titanium-based alloy (e.g., Ti-6Al-4V) with additive iron-nickel-cobalt alloy (e.g., Kovar™ alloy of CRS Holdings Inc., Wilmington Delaware with a nominal composition of Fe-29Ni-17Co-0.30Mn-0.10Si) ribs for decreasing effective coefficient of thermal expansion (CTE) relative to only the titanium alloy. Titanium's or its alloys' CTE may be about 60% greater than that of Kovar™ alloy. Thus, with increased temperature, the Ti-Kovar™ hybrid will expand less than Ti alone. In cases otherwise subject to undesirably high heating, this may compensate for thermal expansion (that would otherwise increase clearance with the rotor) and provide a target limited clearance throughout the flight envelope.

There may be other situations where the opposite effect is desired (e.g., to increase effective CTE relative to that of the Ti alloy alone). Titanium's or its alloys' (e.g., Ti as largest by-weight constituent, optionally at least 50%) CTE may be about 20% less than those of nickel or its alloys (e.g., Ni as largest by-weight constituent, optionally at least 50%). Thus, with increased temperature, the Ti—Ni hybrid will expand more than Ti alone. In situations where thermal expansion of a Ti alloy case relative to thermal/centrifugal expansion of the rotor, this increased effective CTE of the Ti—Ni hybrid may compensate for expansion of the rotor to reduce the chance of rub and help provide a target limited clearance throughout the flight envelope. Example Ni alloys are Ni superalloys such as UNS N07718 (AMS5662/W.Nr. 2.4668) (a NiCrFe alloy), UNS N06625-W. Nr. 2.485) (a NiCrMo alloy), UNS N07750 (W. Nr. 2.466) (a NiCrFe alloy) and Inconel™ 939 (a NiCrCo alloy) of Special Metals Corporation, Huntington, West Virginia, USA.

Figure 5:
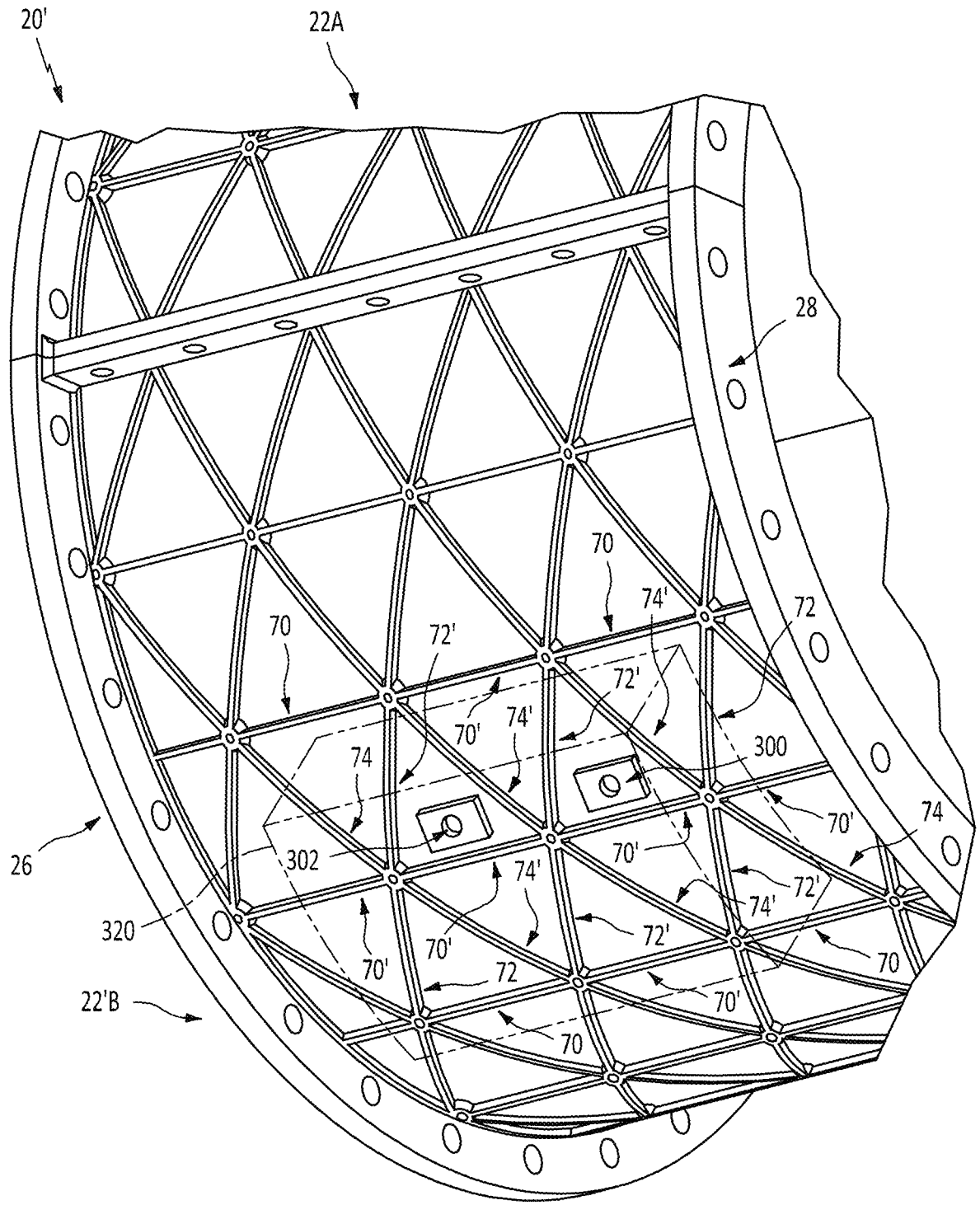
FIG. 5 is a view of an alternate gas turbine engine isogrid case assembly.

In further variations, the machining or the additive material may form mounting features for additional components. For example, FIG. 5 shows a pair of mounting bosses 300 protruding from the wall 38. Example mounting bosses may be made of the same base material as the wall (e.g., titanium alloy in the examples above) or a dissimilar material (e.g., the rib material). The bosses have threaded mounting holes 302 (e.g., as may be rough formed in the additive manufacture and then bored and threaded thereafter). Example mounted hardware includes fuel lines and electronics modules 320. Depending on the stresses imposed by such hardware, the rib pattern may be made locally more dense or ribs made more robust of cross-section This increase in robustness prevents the weight or inertial loads of the mounted hardware from deforming the case (either dynamically or statically).

Figure 6:
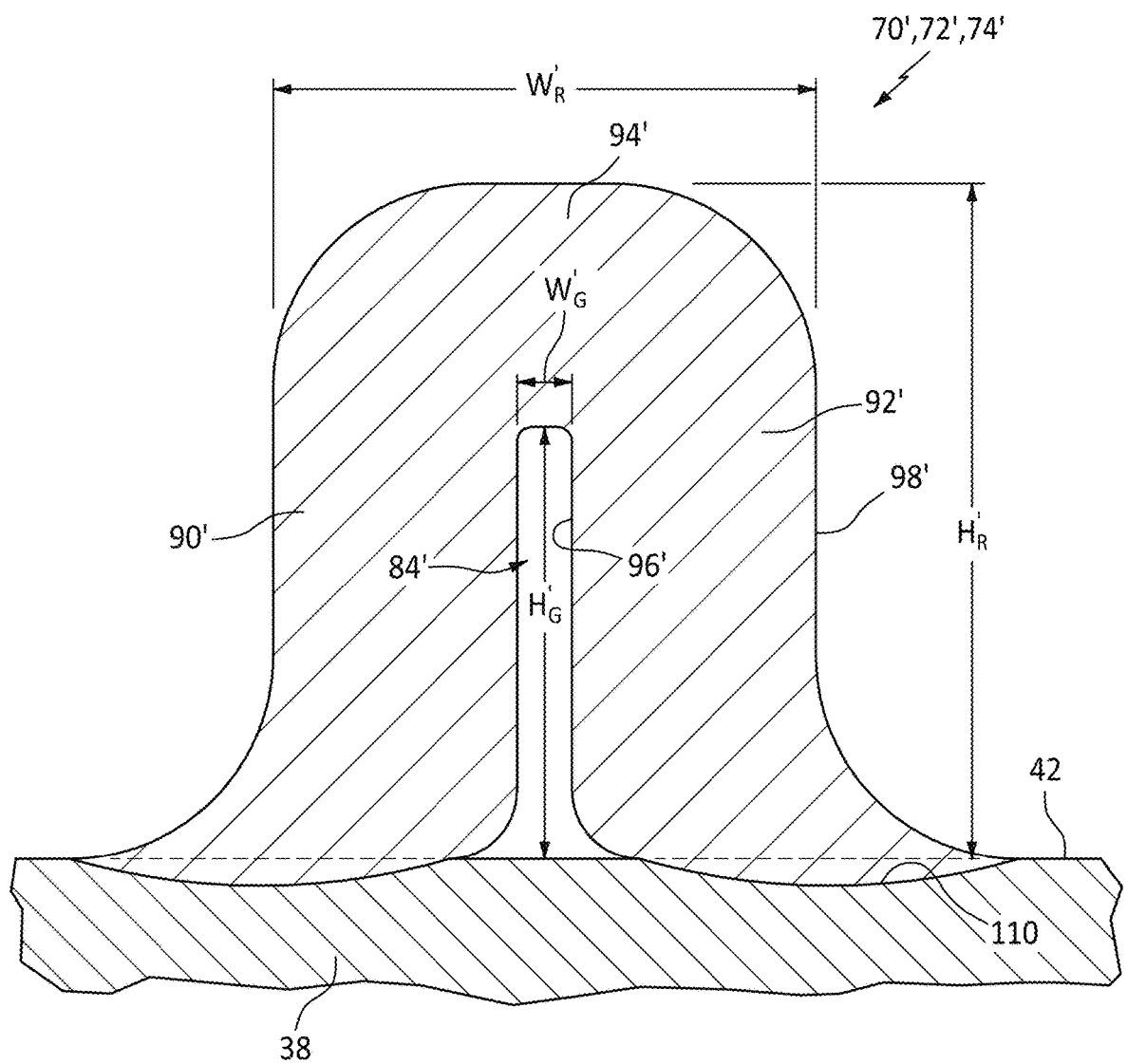
FIG. 6 is a sectional view of a rib of the isogrid of FIG. 5.

For example, if mounted on a lower half of the case, weight of the mounted equipment may bulge the case outward. In any mounting, inertial loading may cause outward and/or inward deformation. FIG. 5 identifies more robust ribs 70', 72', and 74'. These are limited to a zone surrounding the mounting features 300. Remaining ribs are less robust. For example, FIG. 6 shows a more robust rib as an alternative to that of FIG. 3 but having a similar exterior envelope/dimensions. The internal gap 84' is narrowed to width W'G and shrunken heightwise to height H' so that the walls, 90', 92', and 94' are thicker than their FIG. 3 counterparts. This, however, is but one example and others may have yet different properties including different exterior envelopes. Thus, example exterior width W'R and height H'R are preserved relative to the FIG. 3 example elsewhere on the case. The example FIG. 5 case differs from that of FIG. 1 in that its lower half 22'B has such mounting features and also becomes asymmetric if the mounting features are only on one side of the case half (e.g., closer to one of the circumferential end flanges than to the other). In one group of examples, the narrowed median width W'G is about 15% to 50% of $W_G$ and $H'_G$ is about 70% to 90% of $H_G$.

In further example, rather than being U-shaped, the ribs could be closed channel so that a web of additive material along the wall 38 joins the rib sidewalls.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:
1. An isogrid structure comprising:
   a wall having a first face and a second face; and
   an isogrid of hollow ribs on the wall second face and having respective rib interiors, wherein:
   junctions of the ribs are at bosses having an interior surface open to the rib interiors and an external environment;
   the wall comprises a first alloy; and
   the ribs comprise a second alloy different from the first alloy.
2. The isogrid structure of claim 1 wherein:
   the structure is a 180° segment;
   the wall has a first circumferential end flange and a second axial end flange; and
   the wall has a first axial end flange and a second axial end flange.
3. The isogrid structure of claim 1 wherein:
   the first alloy is a titanium alloy; and
   the second alloy is an iron-nickel-cobalt alloy.
4. The isogrid structure of claim 1 wherein:
   the first alloy is a titanium alloy; and
   the second alloy is an aluminum alloy.
5. The isogrid structure of claim 1 wherein:
   the isogrid case structure has:
      a first longitudinal end at a first end flange;
      a second longitudinal end at a second end flange;
      a first circumferential end at a first longitudinal flange; and
      a second circumferential end at a second longitudinal flange; and
   the body section first face is concave between the first longitudinal flange and the second longitudinal flange.
6. A gas turbine engine including the isogrid structure of claim 1 and further comprising:
   a plurality of vanes mounted to the wall.
7. The gas turbine engine of claim 6 further comprising:
   a second isogrid structure mounted to the isogrid structure to form a full annulus.
8. The gas turbine engine of claim 7 wherein:
   an external component is mounted to the case structure via one or more features on the wall.
9. A method for manufacturing the isogrid structure of claim 1, the method comprising:
   machining of the wall from billet; and
   additively manufacturing the ribs to the wall.
10. The method of claim 9 wherein:
    the additive manufacture is material jetting.
11. A method for using the isogrid structure of claim 1, the method comprising:
    mounting vanes to the wall; and
    mounting the structure as case segment of a turbine engine.
12. The method of claim 11 further comprising:
    running the engine wherein the ribs restrain thermal expansion of the wall.
13. An isogrid structure comprising:
    a wall having a first face and a second face; and
    an isogrid of hollow ribs on the wall second face and having respective rib interiors, wherein:
    junctions of the ribs are at bosses having an interior surface open to the rib interiors and to an external environment.
14. The isogrid structure of claim 13 wherein:
    the wall comprises a first alloy; and
    the ribs comprise a second alloy different from the first alloy and additively manufactured to the wall.
15. The isogrid structure of claim 13 wherein:
    the bosses are annular.
16. A gas turbine engine including the isogrid structure of claim 13 and further comprising:
    a plurality of vanes mounted to the wall.
17. A method for using the isogrid structure of claim 13, the method comprising:
    mounting vanes to the wall; and mounting the structure as case segment of a turbine engine.

18. A method for manufacturing an isogrid case structure, the method comprising:
   machining a body section having a first face and a second face; and
   additively manufacturing to the second face an isogrid of hollow ribs with bosses at nodes of the isogrid, the bosses having an interior surface open to the rib interiors and an external environment.

19. The method of claim 18 wherein:
   the isogrid case structure has:
      a first longitudinal end at a first end flange;
      a second longitudinal end at a second end flange;
      a first circumferential end at a first longitudinal flange; and
      a second circumferential end at a second longitudinal flange; and
   the body section first face is concave between the first longitudinal flange and the second longitudinal flange.

20. The method of claim 18 wherein:
   the body section is of a first metal or alloy and the ribs are of a second metal or alloy having a different largest by weight element than does the first metal or alloy.

* * * * *